Sept. 15, 1942. M. S. JOHNSON 2,295,739
BRAKE HANGER SUPPORT AND RETAINER
Filed May 27, 1941
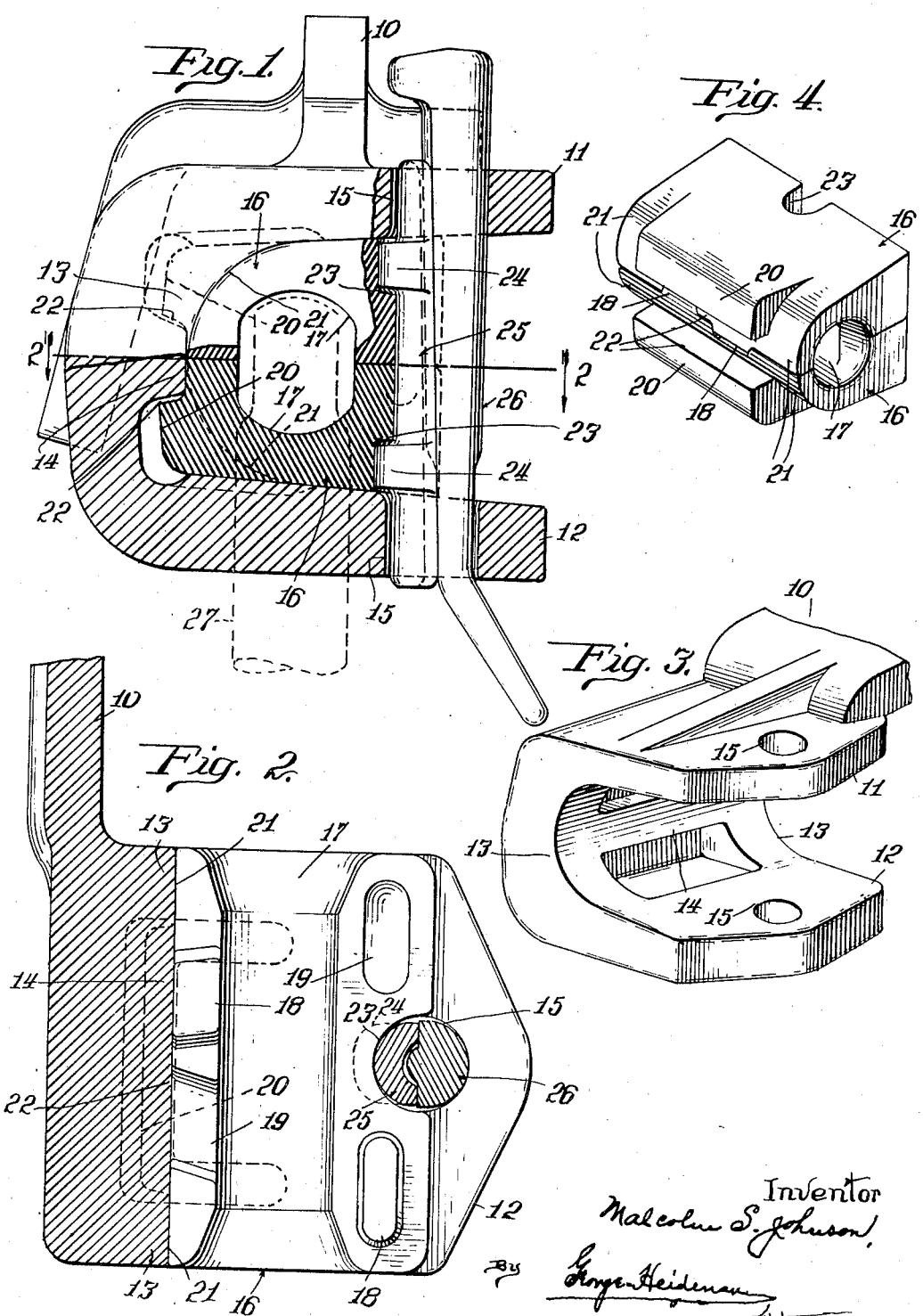
Inventor
Malcolm S. Johnson
By George Heideman
Attorney.

Patented Sept. 15, 1942

2,295,739

UNITED STATES PATENT OFFICE 2,295,739

BRAKE HANGER SUPPORT AND RETAINER

Malcolm S. Johnson, Chicago, Ill., assignor to Illinois Railway Equipment Company, Chicago, Ill., a corporation of Illinois Application May 27, 1941, Serial No. 395,437

8 Claims. (Cl. 188—209)

My invention relates to the bracket and retainer elements for swingingly supporting the usual link hanger from the truck frame of a railroad car, namely a bracket which is preferably formed integral with the truck frame and provided with a laterally disposed open ended socket adapted to receive the retainer elements composed of superposed blocks channeled on their contacting faces to receive the upper end of the bracket head supporting links so as to permit the latter to straddle the lower block and the lower wall of the bracket socket and permit the links with attached brake heads to swing horizontally.

The invention has for its object the provision of a bracket having laterally disposed and vertically spaced jaws to form a socket therebetween reenforced at their inner ends and at their sides by forwardly presented vertical ribs with arcuate forward faces, while the rear wall of the bracket is also provided with a transversely disposed rib whose front face preferably is arranged in the same vertical plane as the front surfaces of the side ribs, so as to provide a substantially full bearing transversely of the bracket for the retainer blocks.

The invention also has for its object the provision of retainer blocks adapted to seat against the side and horizontal ribs and to also effect interengaging relation therewith so as to individually confine the two retainer blocks and eliminate any rolling tendency of the latter resulting from the vibrations and thrusts transmitted thereto by the brake head supporting link.

Another object of the invention is the provision of a bracket, formed as stated, and correlated retainer blocks having interengaging surfaces so arranged that each retainer block will be individually confined in the bracket regardless of whether one of the blocks is lost or misplaced, with the upper block at its rear resting on the horizontal rib and having abutting relation with the side ribs, while the lower block extends beneath said rib and therefore cannot cant or roll because of its overlapping relation with said horizontal rib; the contacting or opposing faces of the two blocks preferably being provided with interengaging surfaces whereby relative movement in a horizontal direction of one block on the other will be prevented.

The objects and advantages of my invention will be readily comprehended from the following detailed description of the accompanying drawing herein:

Figure 1 is a partial side elevation and vertical sectional view of my improved bracket and retainer element mounted in the bracket and locked in place, with the upper end of a brake shoe hanger shown in dotted lines.

Figure 2 is a cross sectional view taken on the line 2—2 of Figure 1 looking in the direction of the arrows.

Figure 3 is a perspective view of my improved bracket.

Figure 4 is a similar view of my improved hanger retainer means.

The specific embodiment of the invention illustrated in the drawing involves a bracket whose arm 10 is preferably formed integral with the car truck side frame; the outer end of the arm terminating in a vertically disposed wall whose top and bottom terminate in the laterally disposed top and bottom portions or jaws 11, 12, which preferably taper slightly to provide an open sided socket flared slightly toward the forward open end as shown in Figure 1. In order to reenforce the bracket, the opposite sides of the vertical wall and of the jaws 11, 12 are provided with the vertical side ribs 13, 13 whose forwardly presented faces are shown arcuate to enable these ribs at their ends to flare and merge into the upper and lower jaws, see Figure 3.

With the side ribs arranged as shown and described, the rear end of the retainer receiving socket extends rearward of the forward faces of the side ribs 13, 13 and forms a pocket at the rear of the socket and hence no bearing for the major portion of the retainer blocks is provided, with the result that the retainer blocks have a tendency to roll or rock when subjected to the vibratory movements and thrusts of the brake hanger.

In order to prevent this tendency and to provide a substantially full bearing lengthwise of the inner or rear sides of the retainer blocks, I provide the rear vertical wall of the socket, intermediate the side ribs 13, 13, which are of comparative width, with a horizontally disposed rib 14, whose forward face, which also is of comparative width, extends substantially into the same plane of the forward faces of the side ribs.

The jaws 11, 12, adjacent their forward ends, are provided with aligned holes 15, for receiving the means whereby the hanger holding elements are locked in the bracket socket and later to be described.

In order to properly support the brake head suspending link, indicated in dotted lines at 27, and relieve the bracket of improper wear, it is customary to employ suitable retainer elements consisting of a pair of corresponding blocks 16, 16, adapted to be arranged in superposed relation and combinedly be inserted into the open end of the socket formed by the upper and lower jaws 11, 12. The opposing faces of the blocks 16 are each provided with a longitudinal groove which combinedly form a hanger receiving channel 17, see Figure 4; and these faces on opposite sides of the channel preferably are provided with interengaging portions in the nature of upstanding lugs 18 and sockets 19, alternately arranged.

The rear longitudinal sides of the blocks, throughout the major portion, are provided with flat surfaces as shown at 20, while the ends of the blocks at the rear sides are recessed and provided with arcuate surfaces 21 matching the forward arcuate faces of the bracket side ribs 13, permitting the portions of the blocks intermediate the reduced ends to enter into the rear end of the socket in the bracket; longitudinal movement of the blocks being prevented by the side ribs 13, 13.

As the retainer blocks are of less transverse width than the depth of the socket in the bracket, the blocks merely had bearing on the arcuate faces of the side ribs 13, 13, with the result that the blocks had a tendency to rock or roll, induced by the thrusts and vibratory movements of the hanger.

In order to overcome this tendency and afford a larger bearing surface for the rear sides of the blocks and at the same time effect an interengaging relation with the horizontal rib 14, the rear sides of the major portions 20 of the blocks 16, adjacent their matching faces, are lengthwise cut away or recessed at 22 to a depth corresponding to that of the recessed ends, thereby providing a bearing surface substantially throughout the entire length of the blocks as indicated in dotted lines in Figure 2.

With the horizontal rib 14 extending into the longitudinal recess 22 in the assembled blocks, the latter individually will be confined in proper position as the upper block 16 at the rear will rest on the horizontal rib 14 and be held against rocking movement while the lower block 16 will extend beneath the rib 14 and be held against canting or rolling movement.

The forward longitudinal sides of the blocks 16 are provided with arcuate grooves, laterally inset or recessed at the outer ends, namely at the outer faces of both blocks, as shown at 23 in Figures 1 and 4, for the purpose of receiving the arcuate ribs 24, 24, formed on the outer substantially semi-cylindrical face of the adapter 25, which, in conjunction with the pin 26, constitutes the means for locking the retainer blocks in the bracket socket; the adapter and pin on their contacting faces having interengaging surfaces.

The holes in the jaws 11, 12 are made somewhat larger than the combined thickness of the pin and adapter so as to enable the adapter to maintain a firm binding engagement with the retainer blocks 16, as shown in Figure 1; the arcuate ribs 24 effecting locking means for the forward sides of the retainer blocks against vertical movement and also providing means for preventing vertical movement of the adapter.

The hanger receiving channel 17 in the retainer is preferably made with straight side walls as shown in Figure 1 because of the reduced and vertically elongated upper end of the link shown in dotted lines at 27, so as to minimize the lateral slap of the hanger or link in the retainer.

The exemplification shown and described is believed to be the best embodiment of the invention but certain modifications are possible without, however, departing from the spirit of my invention as defined in the appended claims.

What I claim is:

1. In a brake hanger support and retainer, a bracket arm adapted to be secured to a car truck frame and provided with laterally disposed and vertically spaced jaws formed integral at their inner ends with a vertical wall portion and providing a retainer receiving socket, the vertical wall and the inner ends of the jaws at opposite sides being united by vertical side ribs, while the inner face of the vertical wall, intermediate the spaced apart jaws, is provided with a rib disposed transversely of said wall with its forward face disposed in the horizontal plane of the front faces of said side ribs intermediate their upper and lower ends.

2. In a brake hanger support and retainer, a bracket arm adapted to be secured to a car truck frame, with its outer end disposed vertically and provided with forwardly disposed and vertically spaced jaws, the vertical portion and the inner ends of the jaws at opposite sides being provided with vertical side ribs to provide a retainer receiving pocket, the forward sides of said ribs being concaved, said vertical wall portion intermediate the spaced apart jaws being provided with a horizontally disposed rib whose forward face extends into the horizontal plane of the intermediate portions of said side ribs, all of said ribs being provided with comparatively wide forward bearing surfaces.

3. In a brake hanger support and retainer, the combination of a bracket arm adapted to be secured to a car truck frame and terminating in a vertically disposed wall portion provided at top and bottom with forwardly spaced jaws, the vertical wall and inner ends of the jaws at opposite sides being provided with vertical side ribs to provide a retainer receiving pocket, while the inner face of said vertical wall substantially midway between the jaws is provided with a horizontally disposed rib, and a pair of superposed hanger holding blocks, insertible between said jaws, with their contacting faces formed to provide a link receiving channel therebetween, the rear longitudinal sides of the blocks at their ends being recessed to seat against said side ribs and provided with a recess lengthwise of the blocks adapted to receive said horizontally disposed rib.

4. In a brake hanger support and retainer, a pair of hanger holding blocks of corresponding configuration adapted to be arranged in superposed relation with their contacting faces grooved to provide a hanger link receiving channel therebetween, said blocks having longitudinal rear flat faces recessed at the ends of the blocks and a longitudinal recess adjacent the contacting faces of the blocks while the forward faces of the blocks are vertically grooved to receive a locking pin.

5. In a brake hanger support and retainer, a pair of hanger holding blocks of corresponding configuration adapted to be arranged in superposed relation, provided with vertical rear longitudinal sides having flat faces intermediate the ends of the blocks, the rear sides at the ends of the blocks being recessed, while the intermediate portions of the rear sides adjacent the contacting faces of the blocks have longitudinal recesses communicating with the recesses at the ends and of equal depth.

6. The combination of a bracket formed with forwardly presented vertically spaced jaws and vertical ribs at the inner ends of the jaws on opposite sides of the bracket to form a retainer receiving socket, the rear wall of the socket having a horizontally disposed rib, and a link holding retainer whose ends are adapted to seat against said vertical ribs while the intermediate portion at the rear of the retainer is adapted to receive said horizontal rib.

7. The combination of a bracket formed to provide a forwardly extending socket provided with vertical ribs at the inner end of the socket and at opposite sides of the bracket, while the rear wall of the socket is provided with a horizontally disposed rib, and a pair of superposed link holding blocks adapted to seat against said side ribs, with their intermediate portions formed to extend beyond said horizontal rib and be held against vertical rolling movement.

8. The combination of a bracket formed with a vertical wall having forwardly presented and vertically spaced jaws and provided with forwardly presented bearing surfaces at the inner end of the bracket; and a pair of superposed link holding blocks insertible between said jaws, with their rear longitudinal sides provided with vertically and horizontally disposed recesses adapted to receive said bearing surfaces in the bracket and effect interengaging relation therewith to prevent longitudinal movement of the blocks.

MALCOLM S. JOHNSON.